US006930958B2

(12) United States Patent
Goergen

(10) Patent No.: US 6,930,958 B2
(45) Date of Patent: Aug. 16, 2005

(54) METHOD AND APPARATUS FOR SYNCHRONIZING TIMEKEEPING DEVICES

(76) Inventor: Nate Goergen, RHIT #1492, 5500 Wabash Ave., Terre Haute, IN (US) 47803

( * ) Notice: Subject to any disclaimer, the term of this patent is extended or adjusted under 35 U.S.C. 154(b) by 249 days.

(21) Appl. No.: 10/405,548

(22) Filed: Apr. 2, 2003

(65) Prior Publication Data

US 2003/0185104 A1 Oct. 2, 2003

Related U.S. Application Data

(60) Provisional application No. 60/369,653, filed on Apr. 2, 2002.

(51) Int. Cl.[7] .......................... G04B 47/00; G04C 11/00; G06F 1/12; G06F 15/16

(52) U.S. Cl. ........................... 368/10; 368/46; 709/248; 713/400

(58) Field of Search .............................. 368/10, 46, 47, 368/52; 370/503, 507; 709/248; 713/400

(56) References Cited

U.S. PATENT DOCUMENTS 5,276,659 A * 1/1994 Kotaki ........................ 368/10
5,475,717 A * 12/1995 Cordonnier et al. ........ 375/356
5,615,177 A * 3/1997 Yahata ........................ 368/10
5,689,688 A * 11/1997 Strong et al. ............... 713/375
5,848,028 A 12/1998 Burklin
6,157,957 A * 12/2000 Berthaud .................... 709/248
6,185,217 B1 * 2/2001 Ando et al. ................. 370/403
6,654,356 B1 * 11/2003 Eidson et al. ............... 370/303

* cited by examiner

*Primary Examiner*—Vit W. Miska
(74) *Attorney, Agent, or Firm*—Merchant & Gould P.C.

(57) ABSTRACT

The present invention provides a method for synchronizing timekeeping devices in a system of clocks using a master/slave system and expandable data packet transmission protocol, and an apparatus for implementing such synchronizing system. The method includes embedding a circuit and data packet for transmission into each timekeeping device in the system. Time is synchronized by transmitting time information contained in the data packet protocol from the master timekeeping device to other slave timekeeping devices. Further, slave devices may transmit time information also contained within the data packet protocol to other slave timekeeping devices that are not within range of the master device. A hop count register in the data packet is also relied upon for synchronizing the time as close to the master device. Slave devices requesting time information accept the time from the transmitting device with the lowest hop count. Transmitting devices with higher hop counts are ignored, and the system is synchronized according to a time of the master timekeeping device.

19 Claims, 5 Drawing Sheets

METHOD AND APPARATUS FOR SYNCHRONIZING TIMEKEEPING DEVICES

This application claims the benefit of U.S. Provisional Application Ser. No. 60/369,653, filed Apr. 2, 2002, titled METHOD AND APPARATUS FOR SYNCHRONIZING TIMEKEEPING DEVICES, which is incorporated herewith by reference in its entirety.

FIELD OF THE INVENTION

This invention relates to time synchronization, and more particularly to a method for synchronizing timekeeping devices using a master/slave system and expandable data packet transmission protocol, and an apparatus for implementing such synchronizing system.

BACKGROUND OF THE INVENTION

Most digital timekeeping devices require the manual initial setup of the current time, as well as periodic resynchronization to an ideal time due to the imprecise time keeping mechanisms found within a given device. Time keeping abilities can be found embedded into many appliances, as well as stand alone timekeeping devices. The accumulation of such timekeeping devices introduces many inconveniences due to these generic timekeeping devices' shortcomings mentioned above.

Most digital timekeeping devices to this date do not have the ability to reset themselves in the event of a power failure, or after initial power on. Standalone timekeeping devices as well as the embedded timekeeping devices found in appliances, must each be manually reset if such an event were to occur. Further, individual timekeeping devices do not have the ability to synchronize themselves to a known time standard or to automatically compensate for regional phenomena such as daylight savings time.

U.S. Pat. No. 5,848,028 to Burklin discloses a synchronizing system in which clocks with a plurality of different precision classes are used in synchronizing the clock system. When a particular clock receives the time from another clock, it will receive the time from the clock of highest precision for keeping time. However, in the event the highest precision clock fails to transmit its time, the next lower precision clock takes over broadcasting the time to other clocks. In addition to other disadvantages, only one clock at a time is used to transmit its time to all the other clocks in the system.

The present invention solves many of the problems associated with the prior art.

SUMMARY OF THE INVENTION

The present invention provides a method for synchronizing time-data timekeeping devices in a system of clocks, and further, a system for implementing the same. Further, the present invention provides a method for relaying non-time data in timekeeping devices in a system. The present invention further includes a timekeeping device implemented in such a system. Preferably, the present invention is used in a household environment.

In one embodiment, a method for synchronizing a system of timekeeping devices includes setting a master timekeeping device to a particular time. Further, time data from the master timekeeping device may be transmitted to at least one slave timekeeping device(s) in the system so as to set the slave timekeeping device(s) to be synchronized with the time of the master timekeeping device. Slave devices may also request and receive time data from the master device. Moreover, slave timekeeping devices that are synchronized with the master timekeeping device might also transmit time data to other slave devices not within range of the master device. The time of these slave devices may be set to a time as least removed but not directly from the master device. The synchronization system relies upon accepting time data transmitted from the timekeeping device transmitting the lowest hop count and ignoring time data from other timekeeping devices transmitting higher hop counts.

In another embodiment, a time synchronization system comprises a master timekeeping device that transmits time data. Also included is at least one time data transmitting and receiving slave device effective for receiving time data from the transmitting timekeeping device. Further, the system comprises an open-ended expandable data packet transmission protocol. This open-ended expandable data packet transmission protocol further comprises a standard packet and an extended packet. A mode switch includes at least an inactive mode and a synchronize mode for the slave transmitting device(s) and a mode switch includes at least an inactive mode, synchronize mode, and a transmit mode for the master timekeeping device.

In yet another embodiment, a method for relaying non-time data in timekeeping devices in a system of timekeeping devices comprises relaying non-time data that other devices may wish to transmit using the extended packet from the open-ended expandable data packet transmission protocol. Also, a master or slave device may receive non-time data and relay it to other devices in its range.

In yet another embodiment, a timekeeping device comprises a master device or a slave device. Further included in a timekeeping device may be a circuit for transmitting and receiving a transmission data packet. The transmission data packet further comprises a standard packet and an extended packet. A master device comprises a mode switch including at least a transmit only mode, synchronize mode, and an inactive mode. A slave device comprises a switch including at least a synchronize mode and an inactive mode.

The advantages and features of the novel method characterizing the invention are pointed out with particularity in the claims annexed hereto and forming a part thereof. However, for a better understanding of the inventive method, its advantages and objectives attained by its use, reference should be made to the drawings which form a further part hereof, and to the accompanying description, in which there is described the embodiments of the invention.

DETAILED DESCRIPTION OF THE DRAWINGS AND PREFERRED EMBODIMENTS

Figure 1:
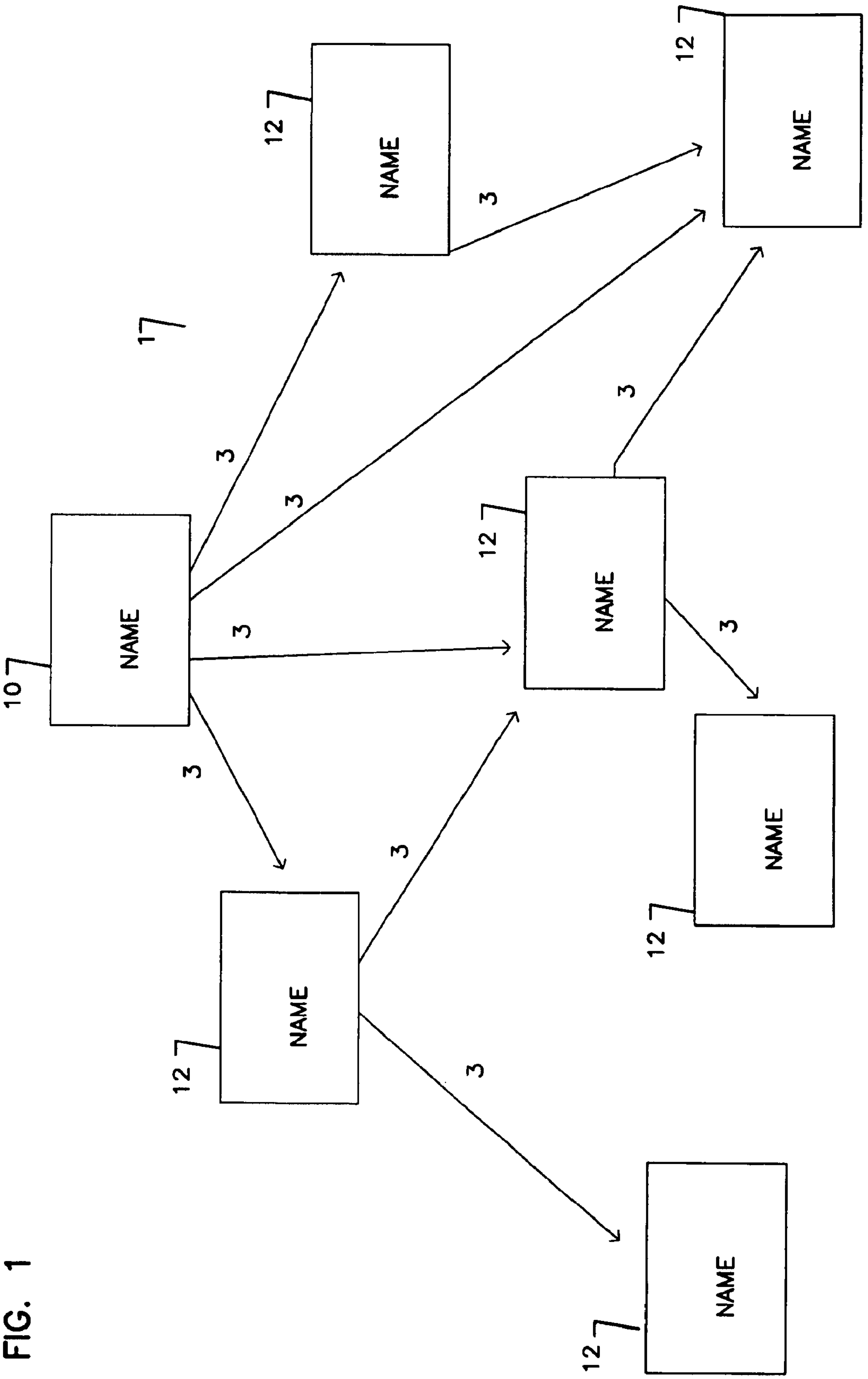
FIG. 1 is a block diagrammatical view of an embodiment of the master/slave device system in accordance with the principles of the present invention.

Referring now to the drawings, with reference to FIGS. 1 and 2, there is shown a preferred embodiment of a master timekeeping device 10, which transmits a signal 3 that includes a expandable data packet transmission protocol 20*a* (shown in FIGS. 2 and 3), hereinafter, data packet 20, illustrated by arrowed lines, to each of slave devices 12. Also shown, one slave device 12 may be able to transmit a signal 3, illustrated by arrowed lines, to another slave device 12. Further in FIG. 2, a data packet 20 is to be transmitted and is the protocol contained in signal 3. In one preferred embodiment for synchronizing a system 1 of timekeeping devices, a master device 10 is set to a particular time. The master device 10 may be set by, but is not limited to, manual means, or even set remotely by an outside time information dispensing mechanism. A slave device 12 preferably requests and accepts a signal 3 and data packet 20 transmitted from the master device 10 or other slave device 12 that is closest to the master device 10. The system 1 of time keeping devices relies on each of the timekeeping devices keeping a hop count register (discussed below) for transmitting and receiving the data packet 20. Requesting slave devices 12 accepts the time data transmission of a device with the lowest hop count. The slave devices 12 may be able to receive time data without a request, such as through an interface or button that allows the master device 10 to transmit its time data without a request from a slave device 12 (discussed below and shown in FIG. 4). For example, the master device 10 may wish to synchronize all slave devices 12 in the system 1 in the event of a power failure, or if the time of the master device 10 was changed by a user. Synchronization is achieved when the time is set for all slave devices 12 according to or as close to the master device 10.

Figure 2:
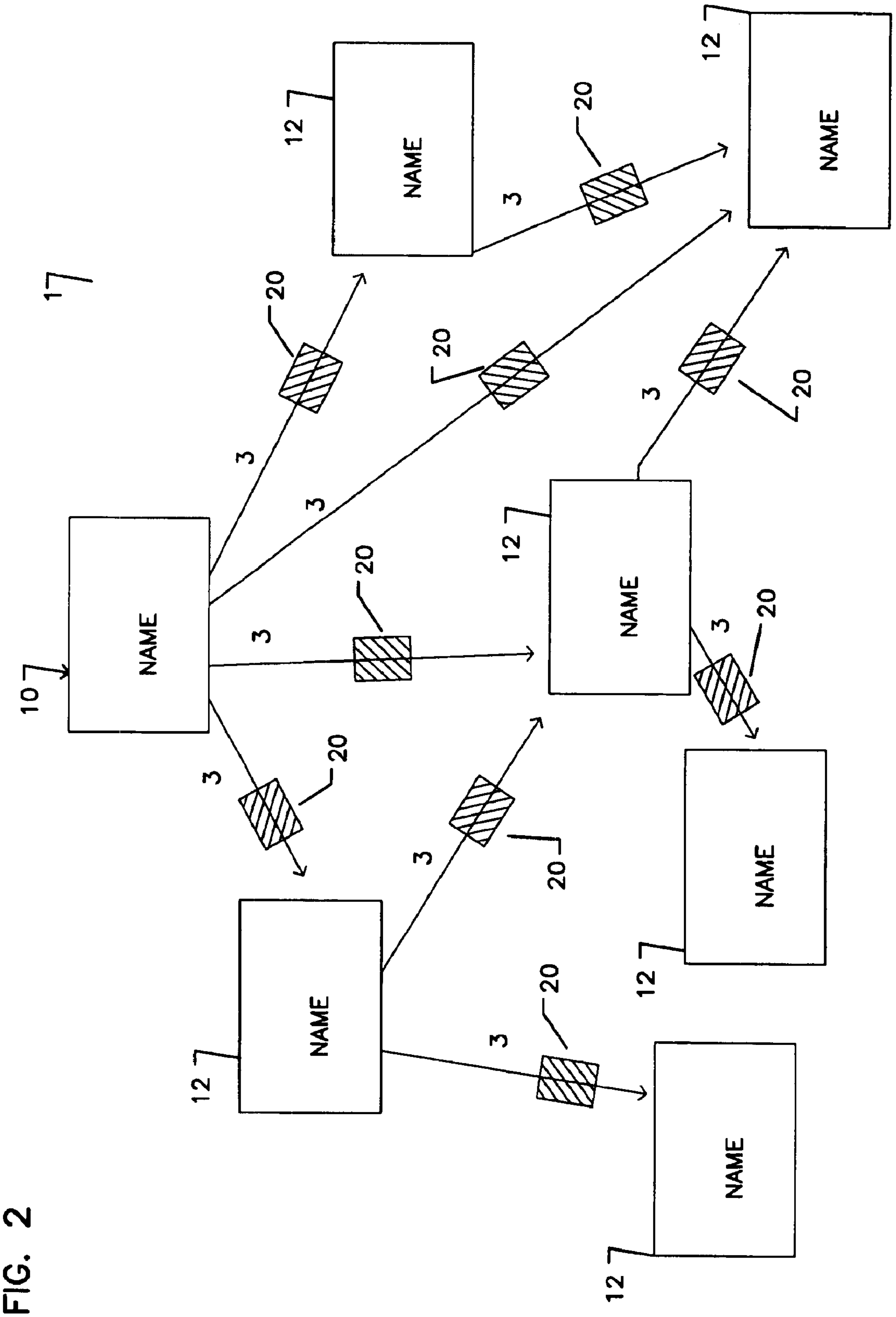
FIG. 2 is a block diagrammatical view of the master/slave device system of FIG. 1 with a schematic view of an embodiment of the expandable data transmission packet in accordance with the principles of the present invention.
Figure 3:
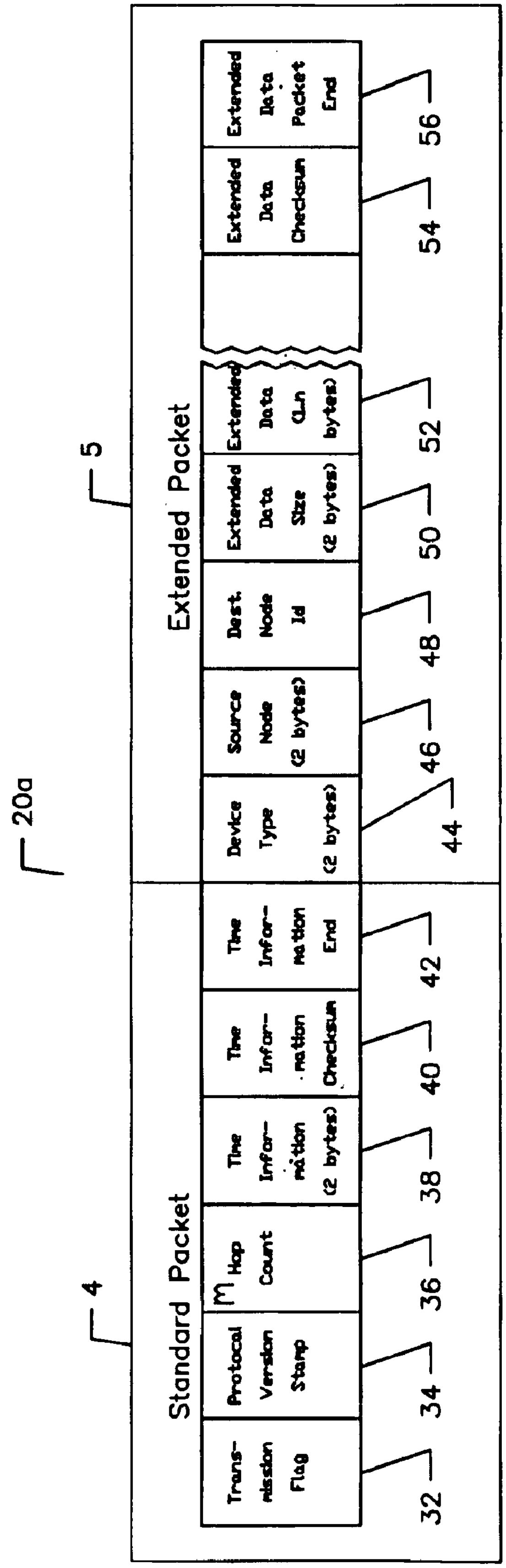
FIG. 3 is a detailed schematic diagram of one embodiment of the protocol for the expandable data packet of FIG. 2.

FIG. 3, shows a more detailed description of a preferred embodiment of the data packet 20 transmitted in FIGS. 1 and 2. One preferred embodiment includes an expandable data packet transmission protocol 20*a* with both a standard packet 4 and extended packet 5. The standard packet 4 further includes protocol fields for a transmission flag 32, protocol version stamp 34, hop count field 36, time information 38, time information checksum 40, and time information end 42. The transmission flag 32 is the signal for the beginning of transmitting the data packet 20. The version stamp field 34 contains a protocol version number to facilitate future revisions of the data packet transmission protocol 20 standard. Hop count field 36 for the master device 10 and each respective slave device 12 preferably contain a number, indicated by single-digit increments, equal to the number of devices that have previously transmitted time information data in a cascade originating from the master device 10 transmission. Namely, a slave device 12 keeping a hop count register preferably contains a number corresponding to the number of devices removed from the initial transmission of the master device 10. Every device adds a single-digit increment to the hop count register of the hop count field 36 when transmitting time information data. For example, the master device 10, as it is the first device transmitting to all the other slave devices 12 within the system 1, might have a hop count field 36 of one being transmitted. Further, a slave device 12, which receives a transmitted data packet 20 from the master device 10, having a hop count of one, subsequently adds one to its existing hop count register in this hop count field 36 when transmitting data to other slave devices 12, thereby transmitting a data packet 20 with a hop count of 2. Each slave device 12 shall synchronize its time with the master device 10 or a slave device 12 that is nearest to the master device 10. For slave devices 12 not within range of the master device 10, transmission is accepted from the slave device 12 with the lowest hop count transmitting to the respective slave device 12. Therefore, if a slave device 12 were to receive time information from two transmitting sources; for example, one slave device 12 having a hop count of three and one slave device 12 having a hop count of four, the requesting slave device 12 synchronizes its own time to that of the transmitting slave device 12 having a hop count of three, and disregards the time information from the device having a hop count of four. When this particular slave device 12 transmits a data packet 20, it further adds one to its hop count register, as it is one more slave device 12 removed from the master device 10. Further included in the data packet 20 is the time information data field 38, which contains a 24-hour date/timestamp that is the data part of the time data transmission. This field 38 is empty until time data is received from another data packet 20 or if the time of the master device 10 is set and ready to transmit a data packet 20 to other slave devices 12. A time information checksum 40 and time information end field 42, respectively, provide error checking and signals for the end of a transmission of standard data packet 4 or presence of extended information in an extended packet 5 (discussed below). Giving each slave device 12 in the system 1 the ability to relay time information expands the area that the synchronization network can operate, and further allows for lower power requirements, such as, but not limited to, a system in a household.

Two types of timekeeping devices can be implemented in this method: non-intelligent devices and intelligent devices. Non-intelligent devices are those that use this method for nothing more than time clock synchronization. Intelligent devices are those that use the method for time synchronization as well as other types of extended data communication. All devices, both intelligent and non-intelligent, preferably have the ability to relay basic time information. Certain intelligent and non-intelligent devices have the ability to relay extended data transmissions such as date information, in addition to basic time information.

Further in FIG. 3, an extended data packet 5 is shown in which the expandable data packet transmission protocol 20*a* can be expanded to facilitate the communication of other non-time related data amongst devices that are either time enabled or not. Devices to which the extended data information is not applicable (non-intelligent devices) preferably disregard any extended information transmission, accept only time data information, and may then relay the extended information to other devices. Preferably, all devices (both intelligent and non-intelligent) are capable of relaying non-time information received to all other in range devices. More preferably, non-time data can originate from any intelligent device.

The extended data packet 5 includes a device type field 44 that contains information on the type of device transmitting the data packet 20. The source node ID 46 has a unique ID that designates itself as a unique node in a device system. The device itself, through an ID negotiation phase for intelligent devices, chooses this ID. The destination node ID 48 field contains a destination node ID for the data packet 20 of an intelligent device. Using this field, an intelligent device may target a recipient for the data packet 20. A node ID consisting of all high bits may constitute a broadcast packet which is intended to be received by all slave devices 12. For example, intelligent devices, which have extended data abilities, in addition to time abilities, may transmit time information data that also contains information such as appliance specific information using this broadcast feature. A field for data packet size 50 includes the size of the extended data portion of the extended data packet 5. Further, the extended data field 52 is of variable length and is noted by the data packet size field 50. The extended data field 52 contains the device's extended data information transmission such as date information, or other extended data. It will be appreciated that the standard packet 4 may include time related data, such as date and time zone information, in addition to time information stored in the standard packet 4. The break 60 in the extended data field 52 represents the extended data packet being capable of expansion. As the standard packet 4 above, the extended packet 5 also has a checksum 54 and data packet end flag 56. The extended data field checksum 54 is for error checking, and the extended data packet end flag 56 signals the end of the transmission of the extended data packet 5 and the complete transmission of the expandable data packet transmission protocol 20*a*.

The data packet 20 preferably activates the extended data packet 5 portion when a device effective for transmitting extended data is signaled by the time information end flag of the standard packet 4 that extended data is available.

Both intelligent devices and non-intelligent devices are designed to wait for a pre-defined quiet period before attempting to transmit an expandable data packet transmission protocol 20*a*. This would be evident in the event of data collisions, which occurs when two or more devices within range of each other attempt to communicate simultaneously. For example, an invalid transmission or a checksum error preferably indicates a device to halt its transmission and wait after a quiet period until the way is clear to transmit again. Preferably, synchronization is maintained by slave device 12 requests for updated time data and/or non-time data information from the master device 10 or other slave devices 12 within range of the master device 10. In a preferred embodiment slave devices 12 request time and non-time data twice a day, and the time for transmission and reception events between timepieces is approximately one second. However, slave devices may have the ability to provide an interface, such as a button or switch, in order to allow the system user to manually make a request for time data and/or non-time data. For example, a battery-powered device that does not clear its time information when relocated can benefit from such a feature as a button or switch to manually request synchronization. Although not described here in detail, a master device 10 and transmitting slave devices 12 may also transmit data through a similar interface without a request. To prevent unnecessary data traffic, the master device 10 preferably does not transmit data unless one or more slave devices 12 requests synchronization.

The method and apparatus of the present invention would be implemented by embedding a circuit effective for transmitting and receiving an expandable data packet transmission protocol 20*a* into the system 1. The data packet 20 may be communicated by wireless and wired means, which includes, but is not limited to, infrared technology, RF technology, and wiring signal. Preferably, infrared transmission is used for its low power requirements, which can be used in systems such as, but not limited to, a system of timekeeping devices in a household. Transmission by infrared technology is done through a single or multiple infrared emitting diode(s) and an infrared receiver component integrated into the timekeeping devices. The information data may be modulated into a data stream, which is then transmitted and received by the components mentioned above. This further allows the system 1 the ability to relay data over an expanded area. Transmission by RF technology may require an antenna such that it would be designed to transmit and receive data for the assigned FCC frequency. The information data may be modulated and transmitted by RF means. Transmission by wiring may be done by modulating a digital data signal into the alternating current power source of the timekeeping device, which may then be received by other timekeeping devices plugged into the same circuit. Wiring may be used as the transmission medium.

Figure 4A:
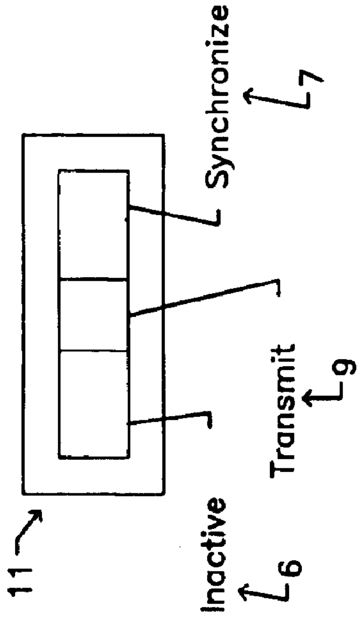
FIGS. 4*a*–4*c* represent diagrammatic views of mode switches in accordance with the principles of the present invention.
Figure 4B:
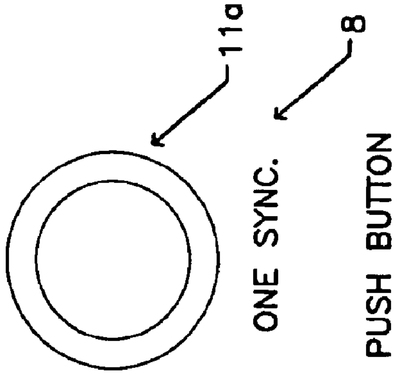
Figure 4C:
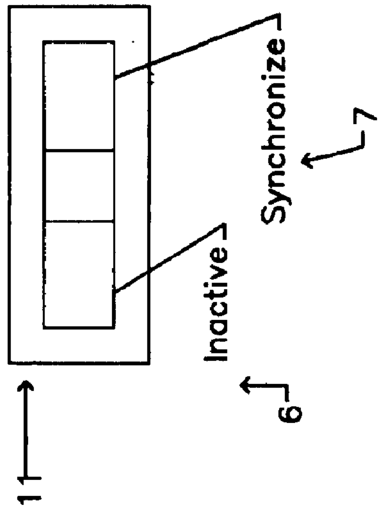

FIGS. 4*a*–4*c* represent embodiments for interfaces for each of the timekeeping devices in the system. FIG. 4*a* shows an interface, such as a switch 11 that may be used in a master/slave capable device having a transmit only mode 9, and further having an inactive mode 6 and a synchronize mode 7. In a preferred embodiment, all slave devices feature at least an inactive mode 6 and a synchronize mode 7 (FIG. 4*c*). Preferably the master device 10 features at least an inactive mode 6, a transmit mode 9, and a synchronize mode 7. Thus, it will be appreciated that the master device may also be selectively made into a slave device. Slave devices 12, which are effective for requesting and transmitting time data information and/or extended data information, are switched to activated synchronize mode 7 (transmit and receive) when involved in the system 1. However, the designated master device 10, which may be effective for a synchronize mode 7, is switched to transmit mode 9 (transmit only), where it only transmits data information to receiving slave devices 12. A device switched to inactive mode 6 is excluded from the system neither transmitting nor receiving data. FIG. 4*b*, shows a button 11*a* for mobile or non-local timepieces such as, but not limited to, wristwatches that are sometimes within the range of the system 1. Devices such as wristwatches may be effective for utilizing a one-sync mode 8, which would synchronize its own time to that of the system 1, and then ignore all time information from other sources until this one-sync mode 8 is activated again. Such mobile devices would then have the option to use the time they receive, or compensate for differences in time-zone.

Figure 5:
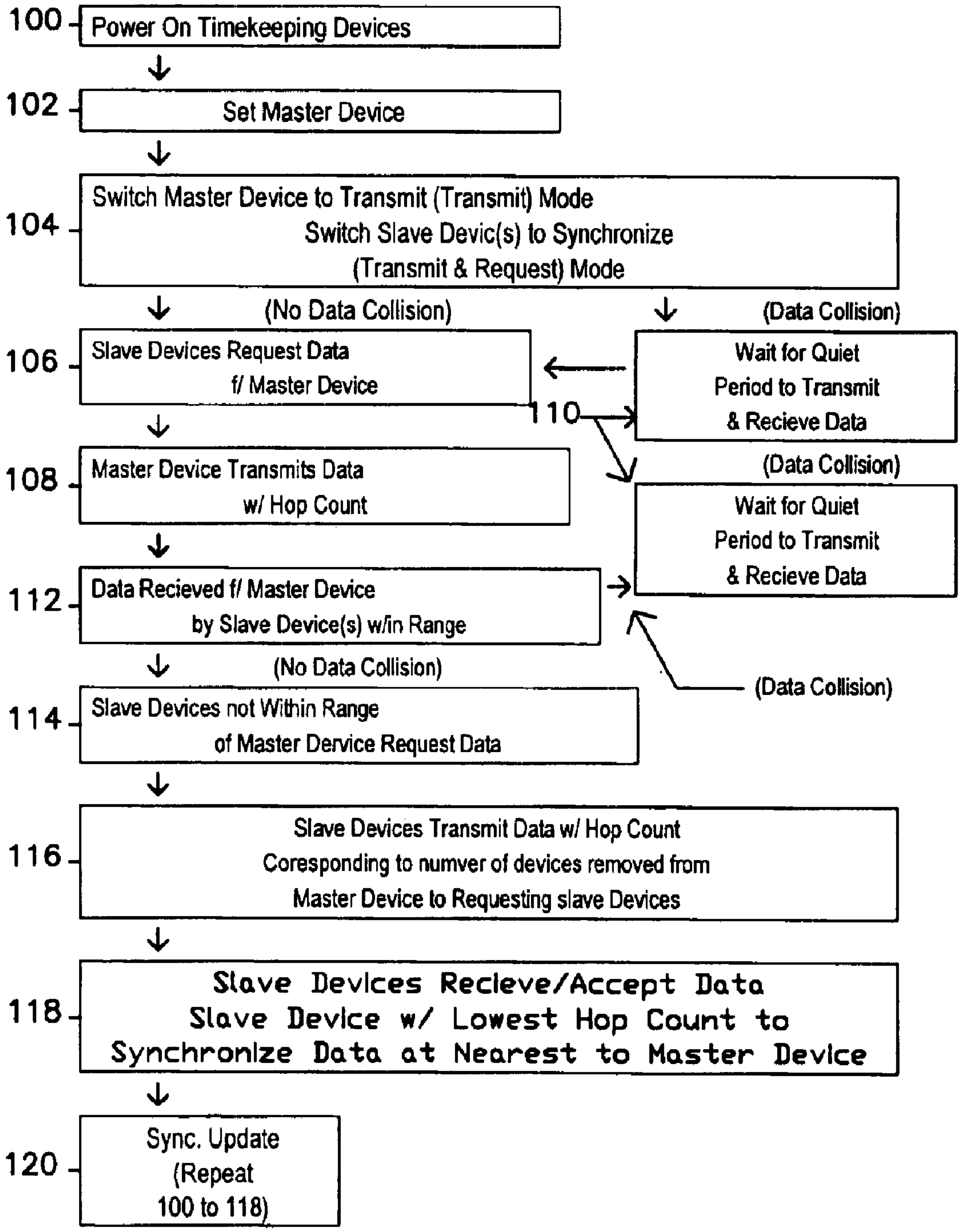
FIG. 5 represents a flow diagram of the method in accordance with the principles of the present invention for synchronization of a system of timekeeping devices.

FIG. 5 represents a flow diagram summary of the events for the method of synchronizing timepieces in a system of timekeeping devices. After powering on the devices in the system 100, the master device is set 102. Switching the master device to transmit mode and switching the slave devices to synchronize mode 104 begins the synchronization of the system 1. If no data collisions are observed synchronization continues. In the event of data collisions 110, devices wait for a quiet period before continuing. After it is clear, slave devices request data from the master device 106, and the master device responds by transmitting its data to the requesting slave devices 108. The slave devices within range of the master device receive data 112. These slave devices in turn may transmit this data received from the master device to other slave devices. Data collisions may again interrupt the continuation of the cascade. In this event devices may wait for a quiet period in which to continue transmission and request 110. After it is clear, slave devices not within range of the master device request data from transmitting slave devices 114. These transmitting slave devices transmit data with a particular hop count corresponding to the number of devices removed from the master device 116. The requesting slave devices not within range of the master device accept data from the transmitting slave device with the lowest hop count, thereby synchronizing as nearest to the master device as possible 118. Synchronization is updated repeating the above steps 120.

As described above, it will be appreciated that the system of timekeeping devices would continue to operate in the event the master device were removed from the system. Slave devices previously closest to the master device will hold their current time setting, while other slave devices in the system continue to accept time information from devices near them with the lowest hop counts.

It is to be understood that while certain embodiments of the present invention have been illustrated and described, the invention is not limited to the specific forms and arrangements of the parts described and shown.

I claim:

1. A method for synchronizing a system of timekeeping devices comprising:

a) setting a master timekeeping device to a particular time;

b) transmitting time data from the master timekeeping device to at least one slave timekeeping device(s) in the system so as to set the slave timekeeping device(s) to be synchronized with the time of the master timekeeping device; and c) requesting and receiving time data by the slave device(s) transmitted from the master device; and d) further including transmitting time data from the slave timekeeping device(s) synchronized with the master timekeeping device to a slave timekeeping device(s) not within range of the master timekeeping device so as to set the slave device(s) not within range of the master timekeeping device to a time as least removed from that of the master timekeeping device.

2. The method according to claim 1, further comprising waiting for a quiet period to transmit time data information in the event of a data collision.

3. The method of claim 1, wherein transmitting a data packet further includes transmitting an expandable data packet transmission protocol.

4. The method of claim 3, wherein transmitting an expandable data packet transmission protocol includes keeping a hop count.

5. The method of claim 4, wherein keeping a hop count includes containing a number, indicated by single-digit increments, the number of prior timekeeping device(s) that have transmitted time data information received initially from the master timekeeping device.

6. The method of claim 4, wherein keeping a hop count further includes adding a number by single-digit increments to the hop count when transmitting time data to other timekeeping devices.

7. The method of claim 4, wherein receiving time data further includes accepting time data from the transmitting timekeeping device with the lowest hop count and ignoring time data from other timekeeping devices with higher hop counts.

8. The method of claim 1, wherein maintaining time synchronization within the system includes the slave device(s) periodically requesting time information data from the master or from another slave device.

9. The method according to claim 1, further providing a wired or wireless means for transmission and said means being infrared radiation, RF radiation, or wiring.

10. A time synchronization system comprising:

a) a time data transmitting master timekeeping device; and b) at least one time data transmitting and receiving slave device including means for receiving time data from the transmitting master timekeeping device or from another slave device as least removed from that of the transmitting master timekeeping device.

11. The system according to claim 10, further comprising intelligent devices effective for transmitting and receiving time data and extended non-time data, and non-intelligent devices effective for transmitting and receiving time-data.

12. The system according to claim 10, further comprises an open-ended expandable data packet transmission protocol.

13. The system according to claim 12, wherein the open-ended expandable data packet transmission protocol comprises a standard packet and an extended packet.

14. The system according to claim 10, further comprising an interface which includes at least an inactive mode and a synchronize mode for the slave transmitting and receiving timekeeping device(s) and includes at least an inactive mode, a synchronization mode, and a transmit mode for the master timekeeping device.

15. A timekeeping device comprising:

a circuit effective for transmitting and receiving time data; and a transmission data packet incorporated within said device, said transmission data packet including means for receiving time data from an originating transmitting master device or from another transmitting timekeeping device as least removed from that of the originating transmitting master device, and said transmission data packet being capable of transmitting time data received using said circuit.

16. The device according to claim 15, wherein the transmission data packet comprises a standard packet and an extended packet.

17. The device according to claim 15, wherein the transmission data packet further comprises means for transmitting a hop count corresponding to a hop count of the originating transmitting device or from another transmitting device least removed from the originating transmitting device.

18. The device according to claim 15, wherein the master device comprises a mode switch including at least a transmit only mode, a synchronize mode, or an inactive mode.

19. The device according to claim 15, wherein the said another transmitting timekeeping device comprises a mode switch including at least a synchronize mode and an inactive mode.

* * * * *